(12) United States Patent
Johansen

(10) Patent No.: US 7,819,375 B1
(45) Date of Patent: Oct. 26, 2010

(54) MODIFICATIONS OF MECHANICALLY ADJUSTABLE SUPPORT DEVICE

(75) Inventor: Dana R. Johansen, Alexandria, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/076,795

(22) Filed: Mar. 24, 2008

Related U.S. Application Data

(60) Provisional application No. 60/907,162, filed on Mar. 23, 2007.

(51) Int. Cl.
*F16M 3/00* (2006.01)
(52) U.S. Cl. .................................... 248/677; 248/188.2
(58) Field of Classification Search ................. 248/677, 248/678, 638, 188.2, 188.5, 188.8, 644, 649
See application file for complete search history.

(56) References Cited

U.S. PATENT DOCUMENTS

| | | | | | |
|---|---|---|---|---|---|
| 3,361,410 | A | * | 1/1968 | Messer | 254/101 |
| 4,798,359 | A | * | 1/1989 | Ball | 248/188.3 |
| 5,080,319 | A | * | 1/1992 | Nielsen | 248/669 |
| 5,163,775 | A | * | 11/1992 | Rowan, Jr. | 403/301 |
| 5,176,465 | A | * | 1/1993 | Holsted | 403/379.6 |
| 7,431,248 | B2 | * | 10/2008 | Cournoyer et al. | 248/188.2 |
| 2006/0054775 | A1 | | 3/2006 | Rowan, Jr. et al. | |
| 2007/0023590 | A1 | * | 2/2007 | Lotz | 248/188.2 |

FOREIGN PATENT DOCUMENTS

WO PCT/US2005/032280    3/2006

OTHER PUBLICATIONS

On Mar. 27, 2006, D. Johansen emailed with attached drawings a vendor informing the vendor that he had an improvement to the vendor's mechanically adjustable chock.
Vibracon Application Design Instructions, Vibracon Manual, Chapter 6, 2007, pp. 1-13, Vibracon's internet web site.
Vibracon SM Elements News, Product Change Announcement, Vibracon SM Design Change: Elimination of Set Screw, no earlier than 2004, pp. 1-2, printed Mar. 3, 2008.
Vibracon SM Elements News, Machine Support's Vibracon Mount Passes USN Heavy Weight Hi-Impact Shock Testing, pp. 1-2, no earlier than 2003, printed Mar. 3, 2008.
Vibracon, Current Status, 1 page, 2007.

* cited by examiner

*Primary Examiner*—Ramon O Ramirez
(74) *Attorney, Agent, or Firm*—Jane M. Barrow; Dave A. Chatt

(57) ABSTRACT

A mechanical support device assembly having a base ring, a shear washer, an adjustable riser and a lenticular washer. The adjustable riser and the lenticular washer fit together in a concave-convex manner. The shear washer fits in the base ring, and the frustum on the upper surface of the adjustable riser is adjacent the concave surface and continuous with it. The shear washer and the frustum provide support to fastener running through the assembly.

4 Claims, 3 Drawing Sheets

MODIFICATIONS OF MECHANICALLY ADJUSTABLE SUPPORT DEVICE

CROSS-REFERENCE TO RELATED APPLICATION

This application claims the benefit of U.S. Provisional Patent Application Ser. No. 60/907,162, filed on Mar. 23, 2007, which is incorporated herein by reference.

STATEMENT OF GOVERNMENT INTEREST

The invention described herein may be manufactured and used by or for the Government of the United States of America for governmental purposes without the payment of any royalties thereon or therefore.

The present invention relates generally to support for machinery, and more particularly, relates to a mechanically adjustable support device for machinery that provides support for machinery and support for an internal fastener during a sudden external shock event and/or fatigue loading.

BACKGROUND OF THE INVENTION

Various types of machinery support devices have been around for years. In its simplest form, a machinery support consists of one or more machinery feet resting on one or more foundations with one or more fastener assemblies at each location to hold the machinery in place. However, machinery feet and foundations themselves are seldom adequately level and parallel. Thus, machinery support devices are added between each foot and the foundation to allow independent adjustments to be made to compensate for misalignment of the height and parallelism between each foot and the foundation. One prior art device often used was to place machined block shims (not show) between the feet of the supported machinery and the machinery foundation. However, the adjustment process required that the shims be repeatedly machined and checked until adequate support, i.e., alignment of both the height and parallelism, had been achieved. This adjustment process has been laborious and expensive.

Fastener assemblies have been used to attach the machinery feet to the foundation. The fastener assembly fits through an opening (hole) in each of the feet in the machinery, the corresponding support device, and the foundation. The fastener opening can be, and often is, limited as to clearance around the fastener. In the event of a large lateral load such as can be developed due to an external shock, the slip planes between the foot and the shim and between the shim and the foundation will try to slide. The limited clearance around the fastener will prevent significant lateral motion. Thus, the fastener will be stressed in shear only. Fasteners are routinely sized to accept this shear stress without failing.

In addition, the shim is much stiffer than the fastener. With standard preload techniques, the shim carries any cyclic loading (such as can be developed by sea-way motions) thus eliminating fatigue issues.

To resolve the expense with the repeated machine-and-check adjustment process described above, a recent prior art support system has been developed. It is a mechanically adjustable support device, otherwise known as a Viacom mechanically adjustable chock (MAC-V), which is shown in FIGS. 1A-1B. The MAC-V assembly 10 has three separate and distinct parts, a base ring 12, an adjustable riser 14, and a lenticular washer 16 resting on the adjustable riser 14. Base ring 12 is threaded on the inside. The adjustable riser 14 can be threaded into base ring 12 to provide for height adjustment. The height adjustment of the adjustable riser 14 can be locked by using an optional set screw 30.

The adjustable riser 14 and the lenticular washer 16 have mating concave/convex spherical surfaces that permit an angular adjustment between the two parts to compensate for foundation 18 and machinery foot 20 being out-of-parallel. The lenticular washer 16 provides for the ability to compensate for this slight angular misalignment of the foot of the machinery 20 relative to the foundation 18 upon which the machinery rests.

An opening 22 receives a fastener 28 through the lenticular washer 16. In order to prevent interference between the lenticular washer 16 and fastener 28 when the lenticular washer 16 slides sideways to adjust for angular misalignment, the opening 22 is larger than the opening 24 in the adjustable riser 14. This difference in opening sizes results in an unsupported length of fastener equal to the height of lenticular washer 16 between the adjustable riser 14 and the machine foot 20. In addition, when the adjustable riser 14, within the ring base 12, is adjusted upward, there can be an unsupported length of fastener between the foundation 18 and adjustable riser 14 equal to the adjustment height.

One problem with the MAC-V 10 is that in the event of a large lateral load such as may occur during a sudden external shock, the slip planes between the foot 20 and the lenticular washer 16, and between the foundation 18 and the ring base 12 will slide past each other in the same way as the shim, except that since there are long unsupported spans between the related parts, the fastener can develop a significant degree of bending stress at each unsupported span. It has been determined that in order to limit the stress on the fastener 28 in MAC-V 10, to the same degree of as the shim method, the shear load carrying capacity of the MAC-V 10 must be limited by about 45%.

Another problem with the MAC-V 10 is that the stiffness of the joint relative to the stiffness of the fastener is much lower than with the shim support method. When cyclic loading is an issue (as it can be due to sea-way motions on a ship), the fatigue life of the fastener in the MAC-V 10 must be specifically addressed by calculation rather than using a set preload as with the shim. The fatigue life of the fastener may be significantly lessened by comparison to the shim method and the ability to withstand large axial loads is similarly reduced.

The present invention is providing improvements to the MAC-V in order to overcome possible bending stresses and fatigue life to the fasteners.

BRIEF DESCRIPTION OF THE DRAWINGS

A more complete appreciation of the invention and many of its attendant advantages will be readily appreciated as the same becomes better understood by reference to the following detailed description when considered in connection with the accompanying drawings wherein.

DETAILED DESCRIPTION OF PREFERRED EMBODIMENTS

Figure 1A:
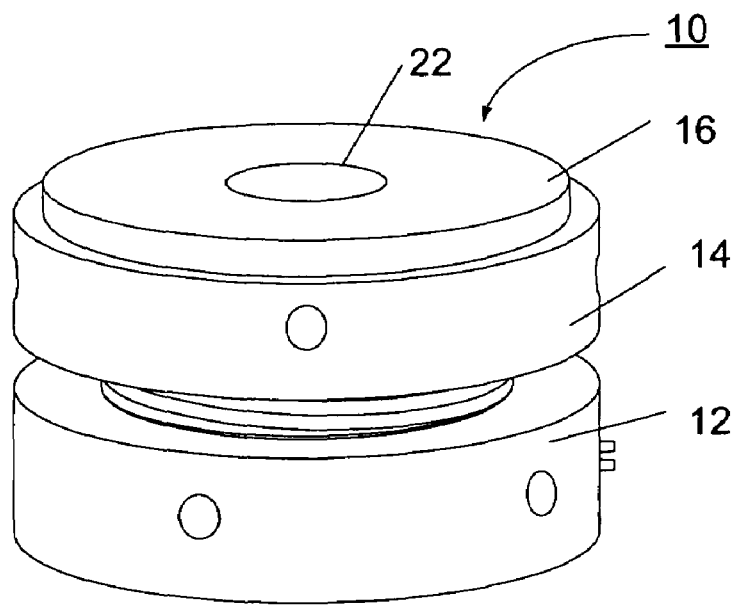
FIGS. 1 (A) and 1 (B) illustrate the Viacom Mechanically Adjustable Chock (MAC-V) as found in the prior art.
Figure 1B:
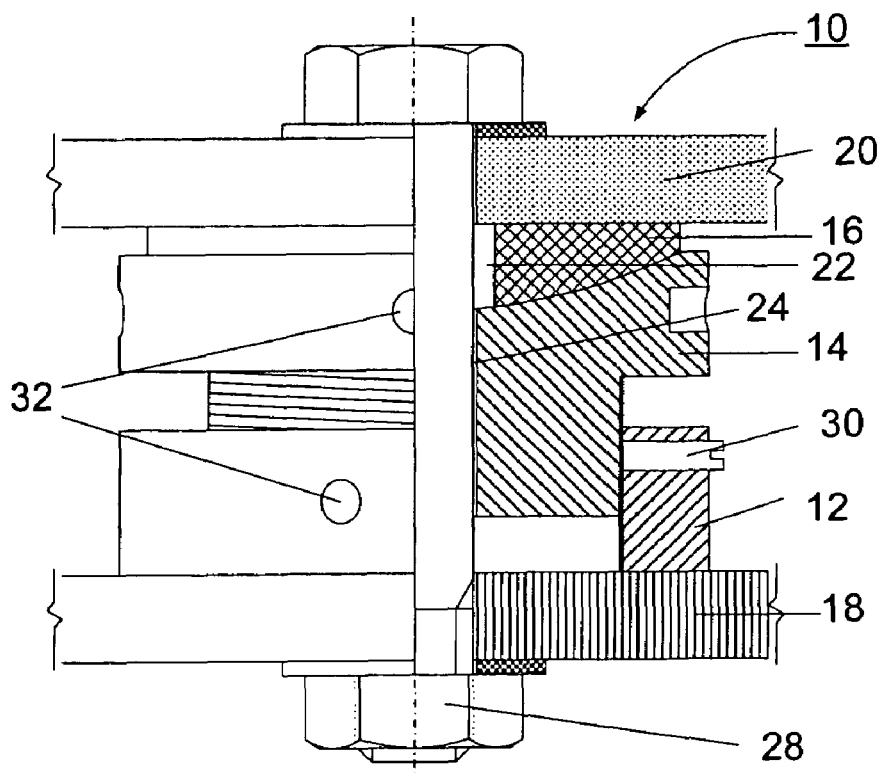
Figure 2:
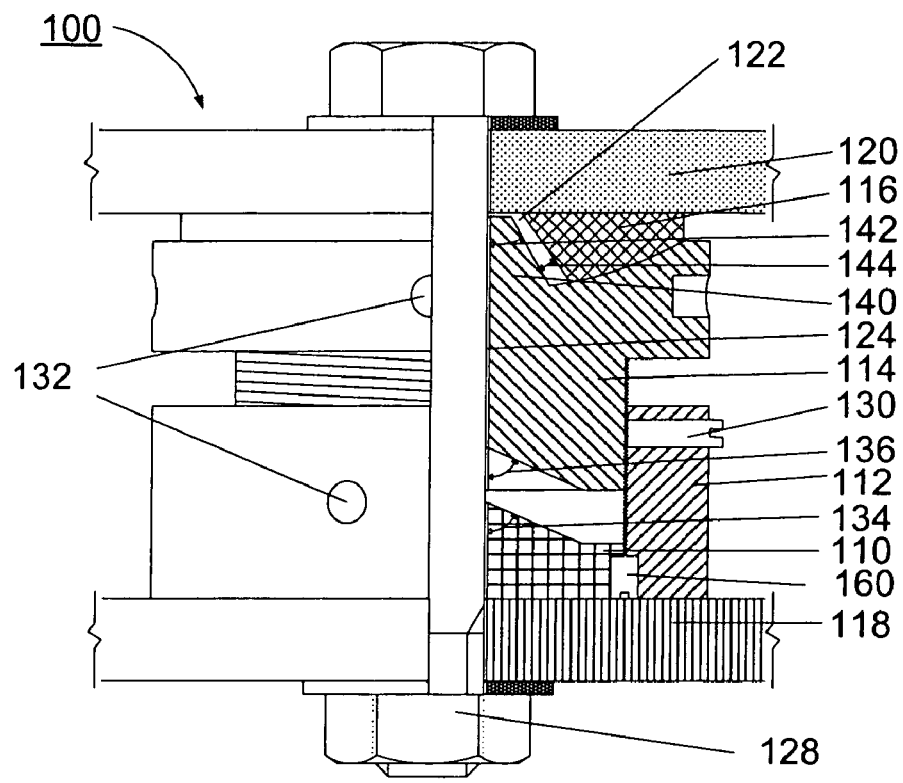
FIG. 2 is a cross-sectional view of a first embodiment of the present invention.

Referring to FIG. 2, an improved mechanically adjustable chock 100 (MAC-I) is shown between a machinery foot 120 and a foundation 118. The MAC-I consists of four parts: a shear washer 110, a base ring 112, an adjustable riser 114, and a lenticular washer 116 resting on the adjustable riser 114.

Figure 3:
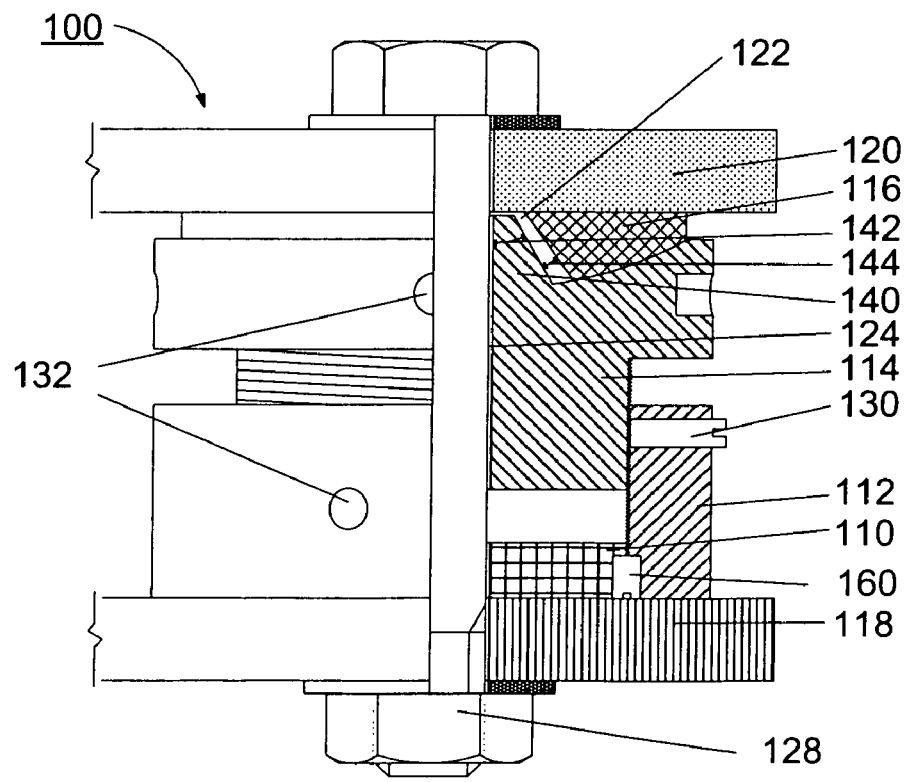
FIG. 3 is a cross-sectional view of a second embodiment of the present invention.
Figure 4:
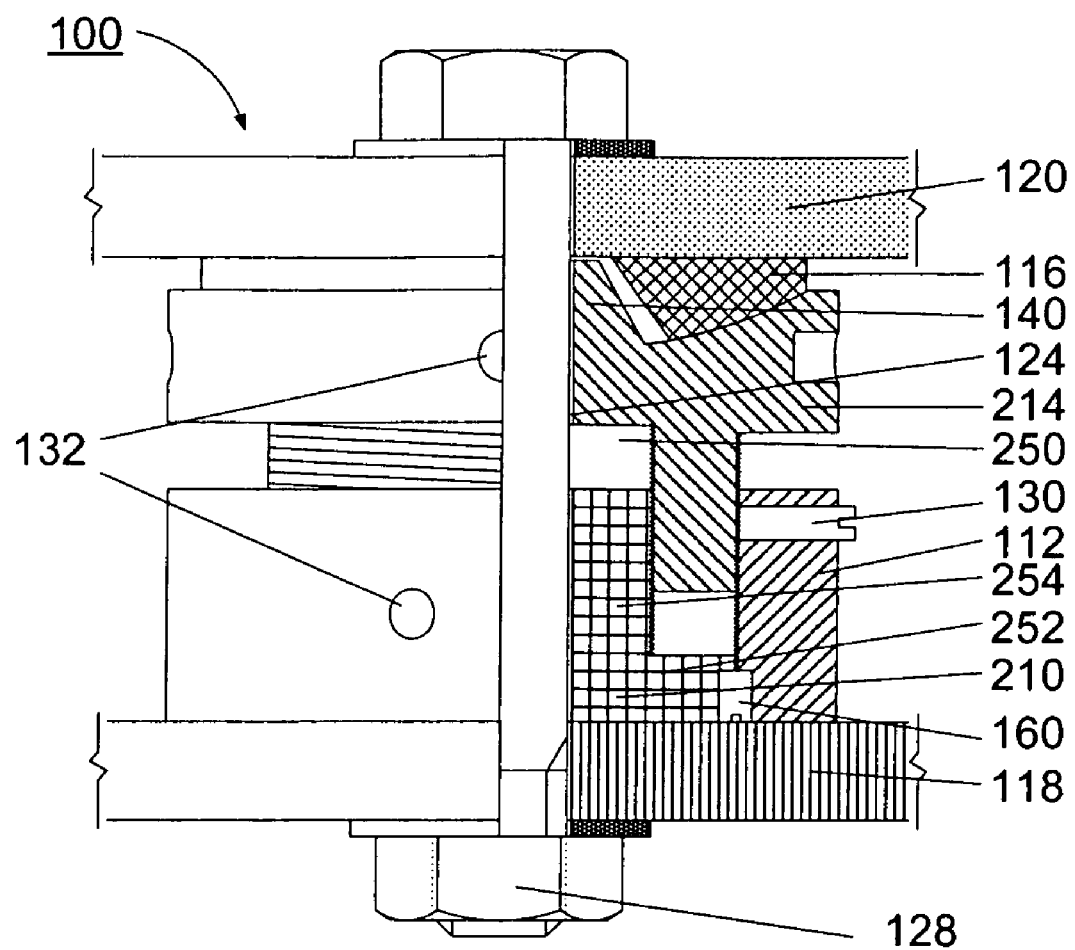
FIG. 4 is a cross-sectional view of a third embodiment of the present invention.

The base ring 112 is partially or completely threaded on the inside. It can be constructed of steel, cast iron, or other metallic material or it can be constructed of a ceramic or composite material or any other material sufficiently strong and tough to carry the loads. It has features, (for example partial openings/holes 132) that are used to apply a torque. It may have means to lock the threads after adjustment of the adjustable riser 114 such as by having a threaded opening to permit use of an optional set screw 130. It may have means to lock the threads of the shear washer 110 after installation such as by having a threaded opening/hole to permit use of an optional set screw 160 as shown in FIGS. 2, 3, and 4 or by other suitable means. The height of the base ring 112 must be sufficient to permit installation of the shear washer 110, an adjustable riser 114, and additional height to permit a defined amount of adjustability.

The shear washer 110 fits into the bottom of the base ring 112. It can be constructed of steel, cast iron, or other metallic material or it can be constructed of a ceramic or composite material or any other material sufficiently strong and tough to carry the loads. In addition to the threaded installation shown in FIGS. 2 and 3, the shear washer 110 can be installed in a rabbit, installed as a cup around the base ring 112, installed as an integral piece with the base ring 112, or installed by other similar means. FIG. 2 shows shear washer 110 as tapered from a thick portion surrounding the fastener 128 to a thinner portion that can be attach or otherwise secured to the base ring 112. The thickness of the shear washer 110 at the fastener opening is selected to carry the shear load and is a function of the material properties of the shear washer 110 and the fastener 128. The taper angle 134 (as shown in FIG. 2) is between 90 and 0° (as shown in FIG. 3) and is selected as desired to minimize overall stack-up height of the MAC-I 100 while still carrying the shear load. The taper need not be linear but can be a non-linear taper, e.g., a partially curved taper. The shear washer 110 can be locked against adverse rotation by using an optional set screw 160 as shown in FIGS. 2, 3, and 4 or by other suitable means.

The adjustable riser 114 is partially or completely threaded on the outside. It can be constructed of steel, cast iron, or other metallic material or it can be constructed of a ceramic or composite material or any other material sufficiently strong and tough to carry the loads. It has means, (for example partial openings/holes 132) that are used to apply a torque. The height of the threads on adjustable riser 114 must be sufficient to permit installation into base ring 112 and additional height to permit a defined amount of adjustability to the height of the MAC-I. The bottom surface of adjustable riser 114 is tapered to receive mate with the tapered part of the shear washer 110, when tapered. This results in angle 136 being approximately equal to angle 134.

The top surface of adjustable riser 114 has a concave spherical recess which mates with a convex spherical lower surface on the lenticular washer 116. Around the fastener opening 124 in adjustable riser 114 there is a shear support frustum 140. The height of the frustum portion 140 is designed to maximally fill the span between the concave surface, outer support portion, of adjustable riser 114 and the machinery foot 120. The thickness of the top surface of the frustum 140 is as thick as needed in order to support the required shear loads and to optimize manufacturability. The taper angle 142 of the frustum 140 is minimized as a function of the material properties and manufacturability in order to maximize the contact between the concave/convex surfaces of the adjustable riser 114 and lenticular washer 116 while still maintaining the ability to carry the required shear loads. For typical materials, the angle 142 is in the range of 45+/−20 degrees. The taper need not be linear. The top surface of the frustum 140 may also be concave spherical (not shown) to receive a smaller convex spherical lenticular washer (not shown) which has a center of rotation equal to the lenticular washer 116. Together the two washers present a more continuous adjustable surface. The frustum 140 can be an integral part of the rest of adjustable riser 114 or can be attached by threading into a suitable opening in the adjustable riser 114 or by other similar means.

The lenticular washer 116 is round with a circular opening in the middle. The inner length of the lenticular washer 116 adjacent the frustum 140 is tapered to match the frustum when the lenticular washer 116 is adjusted to its maximum design adjustment angle. The lenticular washer 116 has a convex spherical bottom surface which mates with the concave spherical surface on adjustable riser 114. The top surface of the lenticular washer 116 is planar. The lenticular washer 116 can be constructed of steel, cast iron, or other metallic material or it can be constructed of a ceramic or composite material or any other material sufficiently strong and tough to carry the loads. The gap 122 between the outer edge of the top surface of the frustum 140 and the opening in the top surface of adjustable riser 116 is sized to allow sufficient lateral displacement of the adjustable riser 116 in order to permit the required adjustability for the non-parallelism between the foot 120 and the foundation 118. The angle 144 of the tapered gap between frustum 140 and the tapered length of the adjustable riser 116 is approximately equal to the desired angular adjustability.

Fastener assembly 128 consists of two strength heads (nuts), two washers where needed, and the fastener shaft. It can be composed of steel or other metallic material or it can be composed of a ceramic or composite material or any other material sufficiently strong and tough to carry the loads.

Referring to FIG. 4, another embodiment of the improved mechanically adjustable chock 100 (MAC-I) is shown between a machinery foot 120 and a foundation 118. This embodiment of the MAC-I consists of four parts, a modified shear washer 210, a base ring 112, a modified adjustable riser 214, and a lenticular washer 116 resting on the modified adjustable riser 214. The lower threaded portion 112 is not changed from the first embodiment as shown in FIGS. 2 and 3.

The modified shear washer 210 is doubly cylindrical with an opening for the fastener assembly 128 through the center. The shear washer 210 is "L-shaped" having a lower end 252 with a large diameter and an upper end 254 with a small outer diameter. The outside surfaces are fully or partially threaded. The lower end 252 fits into the base ring 112. The L-shaped cross-section comprises a substantially vertical portion having a back portion and a threaded portion, the threaded portion of the L-shaped cross-section forming a threaded bore with the partially or completely threaded internal opening, and the threaded bottom portion of the adjustable riser threadedly mates in the threaded bore. In addition to threaded installation as shown, the modified shear washer 210 can be installed in a rabbit, installed as a cup around the base ring 112, installed as an integral piece with the base ring 112, or installed by other similar means. It can be constructed of steel, cast iron, or other metallic material or it can be constructed of a ceramic or composite material or any other material sufficiently strong and tough to carry the loads. The threads, when present, on the lower end 252 and upper end 254 are of the same pitch to allow both surfaces to mate with similar threads on base ring 112 and the modified adjustable riser 214. The height of the end of the lower end 252 set to be sufficient to carry the design shear loads and may be tapered as in the first embodiment as show in FIG. 2 to minimize overall stack-up height. The diameter of the upper end 254 is set to assure that its axial stiffness is substantially greater than (2+ times) the stiffness of the same length of fastener shaft and will be dependant on the materials chosen. The height of the upper end 254 is set so that the part threaded into the modified adjustable riser 214 will carry the axial loads distributed to the modified shear washer 210 by the modified adjustable riser 214 and to permit a defined amount of adjustability.

The modified adjustable riser 214 is in all ways similar to the adjustable riser 114 of FIG. 2 except that there is a opening 250 inserted into the bottom surface of the adjustable riser 214 to accept the upper end 254 of the modified shear washer 210. The depth of the opening is approximately equal to the height to the upper end 254 of shear washer 210. The inside surface of the opening is threaded with the same pitch as the upper end 254 of the modified shear washer 210 and also with the threaded outer surface of adjustable riser 214. The lenticular washer 116 is in all ways the same as the first embodiment as shown in FIGS. 2 and 3.

Obviously, other modifications and variations of the present invention may be possible in light of the foregoing teachings. It is therefore to be understood that within the scope of the appended claims the invention may be practiced otherwise than as specifically described.

What is claimed is:

1. An adjustable support assembly having a central fastener opening, said adjustable support assembly positioned between a load supporting foot and a foundation, said adjustable support assembly comprising:
   a base ring having a partially or completely threaded internal opening, said base ring resting on said foundation;
   an adjustable riser having a continuous upper surface, said adjustable riser comprising:
      a frustum portion and an outer support portion, wherein an upper surface of the frustum portion is connected to a spherical concave surface of said outer support portion forming said continuous upper surface of said adjustable riser, and wherein said adjustable riser is partially or completely externally threaded so as to thread into said base ring until misalignments in height between said foot and foundation are adjusted for;
   a spherical and rotatable lenticular washer having a convex lower surface resting on said concave surface of said adjustable riser and surrounding said frustum portion, wherein said lenticular washer is slidable on said spherical concave surface to adjust for any angular misalignment of a lower surface of said foot and upper surface of said foundation;
   a fastener extending entirely through said central fastener opening and secured at a top end to said foot and at a bottom end to said foundation, wherein said central fastener opening extends through said base ring, said adjustable riser, and said spherical and rotatable lenticular washer;
   a shear washer positioned within said base ring adjacent to said fastener and a lower inner surface of said base ring to add support to said fastener within said base ring.

2. The adjustable support assembly of claim 1 wherein said adjustable riser further comprises a threaded bottom portion, projecting downwards from said frustum portion and said outer support portion, wherein said bottom portion threadedly mates with said partially or completely threaded internal opening of said base ring.

3. The adjustable support assembly of claim 2, wherein said shear washer has a substantially rectangular cross-section, and is positioned within said base ring at a location below said threaded bottom portion of said adjustable riser.

4. The adjustable support assembly of claim 2, wherein said shear washer has a substantially L-shaped cross section, wherein said L-shaped cross section comprises a substantially vertical portion having a back portion and a threaded portion, said threaded portion of said L-shaped cross section forming a threaded bore with said partially or completely threaded internal opening, wherein said threaded bottom portion of said adjustable riser threadedly mates in said threaded bore.

* * * * *